Patented June 1, 1943

2,320,795

UNITED STATES PATENT OFFICE 2,320,795

POLYMERIZATION OF ROSIN AND ROSIN ESTERS

Oscar A. Pickett, Newark, Del., assignor to Hercules Powder Company, Wilmington, Del., a corporation of Delaware No Drawing. Application July 31, 1940, Serial No. 348,686

10 Claims. (Cl. 260—97)

This invention relates to a method of polymerizing rosin and rosin esters and, more particularly, to such a method wherein an acid salt of a polybasic mineral acid is employed.

It has heretofore been proposed to polymerize rosin and rosin esters with sulfuric acid, phosphoric acid, boron trifluoride, ultraviolet light, etc. Prior methods for polymerizing rosin and rosin esters have not been entirely satisfactory. The strong mineral acids such as sulfuric and phosphoric acid are objectionably corrosive of the equipment and tend to exert a charring action upon the rosin or rosin ester. Boron trifluoride is dangerous and inconvenient to handle by reason of its poisonous nature and its gaseous form, and in addition is too expensive. The use of ultraviolet light is inconvenient and unsatisfactory.

I have discovered that rosin and rosin esters can be polymerized conveniently and economically and without tendency of charring by treatment with a polymerizing agent consisting essentially of the mono-alkali salts of sulfuric or phosphoric acid such as sodium bisulfate or monosodium acid phosphate. Such a polymerizing agent is sufficiently mild in its action that conditions may be maintained which could not be employed when using the prior art polymerizing agents, and the reaction can thereby be carried out in a much shorter time for a given increase in melting point of the material being treated. In addition the properties of the material being polymerized are not adversely affected by the treatment, the principal effect of the treatment being the increase in melting point.

Instead of using sodium acid sulfate, there may be used other alkali acid sulfates such as ammonium acid sulfate, potassium acid sulfate, and lithium acid sulfate, and similarly instead of using mono-sodium acid phosphate, mono-ammonium acid phosphate, mono-potassium acid phosphate, and mono-lithium acid phosphate may be employed. However, it is preferred to use either mono-sodium acid sulfate or monosodium acid phosphate.

The general procedure in accordance with the present invention may comprise first dissolving the rosin or rosin ester in a suitable solvent which is preferably of a volatile organic type inert with respect to the rosin or rosin ester and with respect to the polymerizing agent. Examples of suitable solvents are gasoline, benzene, toluene, xylene, cyclopentane, cyclohexane, methyl cyclohexane, decahydronaphthalene, petroleum ether, V. M. & P. naphtha, mineral spirit, menthanes, chlorinated solvents, such as, carbon tetrachloride, dichlormethane, chloroform, tetrachlorethylene, trichlorethylene, ethylene dichloride, monochlorbenzene, o-dichlorbenzene, etc. The rosin or rosin ester is dissolved in the solvent to a concentration of from about 10 to about 75% by weight and preferably from about 35 to about 60%. The higher the concentration, the more rapid the polymerization will be for a given set of conditions.

The catalyst may be added to the solution in a finely divided solid form, the mixture being agitated at a suitable reaction temperature for the desired reaction time so as to maintain the catalyst in suspension in the mixture. The amount of catalyst employed may vary from about 2% to over 100% by weight (calculated on the anhydrous basis) on the weight of the rosin or rosin ester and preferably is employed within the range of from about 15 to about 60% by weight based on the weight of the rosin or rosin ester. The temperature at which the reaction is carried out may be varied within quite wide limits. Temperatures in the range of from about 50° C. to about 275° C. are satisfactory although temperatures of at least about 80° C. are preferred. If temperatures much above 275° C. are employed, there is danger of decomposing rosin or rosin ester. The employment of temperatures below 50° C. makes the reaction so slow that such temperatures are not feasible. In general, the higher the temperature, the greater the rate at which the reaction proceeds. Either atmospheric or superatmospheric pressure up to about 100 atmospheres may be employed.

Where a solid catalyst is used it may be either the anhydrous solid or the solid containing water of crystallization. Thus I may use anhydrous mono-sodium acid phosphate, or this compound with either one or two molecules of water of crystallization.

The catalyst may be employed in a finely divided or granular state or it may be impregnated or suspended on the surface of an inert salt, a silicious or aluminous material with or without promoting action such as activated alumina, bauxite, fuller's earth, bentonite, kieselguhr or infusorial earth, pumice, fire clay, etc., or carbonaceous material such as activated carbon, charcoal, or materials which yield carbon on heating.

Instead of employing the polymerizing agent in the form of a solid as referred to above, it may be employed in the form of a concentrated aqueous solution. Under such conditions, treatment of the solution of rosin or rosin ester with the aqueous solution is preferably conducted under pressure up to about 100 atmospheres and preferably from about 5 to about 100 atmospheres with heating at temperatures varying from about 50° C. to about 300° C., and preferably from about 80° C. to about 300° C. The concentration of the solution of catalyst will depend upon the solubility of the particular catalyst in water at the particular temperature and pressure used, and may vary for example from about 20% to about 90% by weight.

Instead of employing the rosin or rosin ester in the form of a solution, molten rosin or rosin ester may be employed, due caution being taken to limit the temperature employed so as to prevent decomposition of the rosin or rosin ester during the treatment.

Instead of employing a batch procedure, the process may be suitably modified so as to make it continuous, for example, by continuously bringing a solution of the rosin or rosin ester into contact with the catalyst in a polymerizing zone, continuously removing the solution from said zone with or without recirculation a number of times, continuously separating the solution of polymer from the catalyst as by filtration if necessary, and recovery of the polymer by evaporation of the solvent. This might be accomplished by circulating the solution of rosin or rosin ester one or more times over a bed of catalyst which may comprise either the granular catalyst or the catalyst carried upon a suitable inert support such as those referred to above.

The time of treatment is variable within quite wide limits, and will depend upon the temperature, concentration of rosin or rosin ester, proportion of catalyst, pressure employed, and other conditions of the process. In general, the time will lie within the range of from about 5 minutes to about 24 hours, and preferably within the range of from about ¼ hour to about 20 hours. The higher the temperature and concentration of solution, and the higher the pressure employed, the shorter will be the length of treatment necessary to obtain a given degree of polymerization.

The product of the present invention is in general characterized by a melting point from about 5° C. to about 20° C. or higher increase over the melting point of the original material. This is especially advantageous in the case of rosin which has been heretofore characterized by an objectionably low melting point for many uses. The melting point increase appears in general to be somewhat greater in the case of gum rosin than for wood rosin.

Various types of rosin may be treated by the present invention, such as, wood rosin, gum rosin, or rosin which has been previously refined by any of the known methods, such as, isomerization, fractionation, heat treatment, distillation, selective solvents, absorbents, etc. Various types of rosin esters may be treated in accordance with the present invention, such as, polyhydric alcohol esters, such as, ethylene glycol esters, diethylene glycol esters, sorbitol esters, ester gum, mannitol esters, erythritol esters, etc., monohydric alcohol esters, such as methyl, ethyl, propyl and butyl esters, etc., phenyl ester, benzyl ester, etc., crotyl ester, etc., cyclohexyl ester, etc. The esters may be of any of the types of rosin described above. Instead of employing either the rosin or the rosin ester mixtures thereof in any proportion may be employed.

From the foregoing it will be seen that the process of the present invention provides for the mild but effective polymerization of rosin without the disadvantages attendant upon the use of previously proposed polymerizing agents. Other advantages of the process of the present invention will be obvious to those skilled in the art.

Following are several examples showing typical methods according to the present invention.

Example 1

240 g. of WW gum rosin (M. P. 83° C. acid number 164) were dissolved in 160 g. of V. M. & P. naphtha. To this was added 45 g. of finely powdered anhydrous $NaH_2PO_4$ and the mixture was vigorously agitated at 85–90° C. for 15–16 hours. Then the catalyst was filtered off. After washing the residual solution with hot water and evaporating the solvent, a product was recovered having the following characteristics: A. N. 160, M. P. 93.5° C., color G. Higher temperatures shorten still further the reaction period and increase the degree of hardening. Moreover, the process may be modified so as to be continuous.

Example 2

175 g. of FF wood rosin (M. P. 79° C. acid number 162) are dissolved in 325 g. of benzol and to this was added 100 g. of finely pulverized $NaHSO_4$. The mixture was agitated at 75° C. for about five hours, cooled, and filtered from the catalyst. The benzol solution was then water washed and a small amount of alcohol was added to assist removal of water and the solvent then evaporated. The product showed the following characteristics: A. N. 157, M. P. 87.5° C., color about the same as the original.

Example 3

To a solution of 60 g. of WW gum rosin (melting point 83° C., acid number 164) in 40 g. V. M. & P. naphtha, there was added 40 g. of $KHSO_4.H_2O$ in solution in 20 g. of water. The mixture was agitated vigorously in a bomb for about 15 minutes at a temperature of from 210 to 230° C. The pressure registered in the bomb was 1200 lbs. per square inch. After the expiration of this period of time, the bomb was allowed to cool, the reaction mixture was thoroughly washed with water to remove salt and the solvent was evaporated giving a product having an acid number of 160 and a melting point of 91° C. The color was G.

Example 4

Two hundred grams of ester gum were dissolved in 100 g. of benzene. The solution was agitated in a steel bomb for 20 hours at 230–260° C. with 40 g. of finely pulverized sodium acid sulfate. The bomb was cooled and the solution removed, filtered and water washed. The solvent was removed by distillation in vacuo. The characteristics of the product are indicated by the following table:

|  | Original ester gum | Polymerised ester gum |
|---|---|---|
| A. N. | 8 | 10 |
| Drop M. P., ° C. | 94 | 105 |
| Color | K | G |

Example 5

Two hundred grams of WG gum rosin and 50 g. of finely pulverized sodium acid sulfate were agitated vigorously at 245–250° C. for a period of 18 hours in an atmosphere of carbon dioxide to prevent excess darkening in color of the rosin. The rosin was then separated from the catalyst. The properties of the product were as follows:

|  | Original rosin | Polymerized rosin |
| --- | --- | --- |
| A. N. | 163 | 158 |
| Drop M. P., °C. | 83 | 98 |
| Color | WG | I |

In the foregoing examples the conditions may be tabulated as follows:

| Ex. No. | Material | Conc. of solution | Catalyst employed | Per cent of catalyst on material | Temp. | Time |
| --- | --- | --- | --- | --- | --- | --- |
|  |  | Per cent |  | Per cent | °C. | Hours |
| 1 | Rosin | 60 | $NaH_2PO_4$ | 18.75 | 85–90 | 15–16 |
| 2 | ...do | 35 | $NaHSO_4$ | 57.2 | 75 | 5 |
| 3 | ...do | 60 | $KHSO_4$ | 52.6 | 210–230 | ¼ |
| 4 | Ester gum | 66.6 | $NaHSO_4$ | 20 | 230–260 | 20 |
| 5 | Rosin |  | $NaHSO_4$ | 25 | 245–250 | 18 |

It will be understood that the details and examples hereinbefore set forth are illustrative only, and that the invention as herein broadly described and claimed is in no way limited thereby.

What I claim and desire to protect by Letters Patent is:

1. The process of polymerizing a material selected from the group consisting of rosin and rosin esters, which comprises treating said material at a temperature between about 50 and about 275° C. with a polymerizing agent comprising a mono-alkali acid salt of an acid selected from the group consisting of sulfuric and phosphoric acids, said agent being employed in amount equal to at least about 2% by weight based on the weight of said material, for a period of time sufficient to effect at least a 5° C. increase in melting point of said material.

2. The process of polymerizing a material selected from the group consisting of rosin and rosin esters, which comprises treating said material in solution in a volatile organic solvent, the concentration of said material in said solution varying from about 10 to about 75%, with a polymerizing agent comprising a mono-alkali acid salt of an acid selected from the group consisting of sulfuric and phosphoric acids, in an amount varying from about 2 to about 100% by weight based on the weight of said material, at a temperature varying from about 50° C. to about 300° C. for a period of time varying from about 5 minutes to about 24 hours and under a pressure varying from about 1 to about 100 atmospheres so as to bring about polymerization of said material.

3. The process of polymerizing a material selected from the group consisting of rosin and rosin esters, which comprises treating said material in solution in a volatile organic solvent, the concentration of said material in said solution varying from about 35 to about 60%, with a polymerizing agent comprising a mono-alkali acid salt of an acid selected from the group consisting of sulfuric and phosphoric acids, in an amount varying from about 15 to about 60% by weight based on the weight of said material, at a temperature varying from about 50° C. to about 300° C. under a pressure varying from about 1 to about 100 atmospheres for a period of time varying from about ¼ to about 20 hours sufficient to bring about polymerization of said material.

4. The process of polymerizing a material selected from the group consisting of rosin and rosin esters, which comprises treating said material at a temperature between about 50 and about 275° C. with at least about 2% by weight based on the weight of said material of a polymerizing agent comprising a mono-alkali acid salt of an acid selected from the group consisting of sulfuric and phosphoric acids, said polymerizing agent being in finely divided solid form and being maintained in suspension in the mixture during the treatment by agitation of the mixture.

5. The process of polymerizing a material selected from the group consisting of rosin and rosin esters, which comprises treating said material with a concentrated aqueous solution of a polymerizing agent comprising a mono-alkali acid salt of an acid selected from the group consisting of sulfuric and phosphoric acids, at a pressure of about 5 to about 100 atmospheres and at a temperature of about 80° C. to about 300° C. for a period of time sufficient to effect at least a 5° C. increase in melting point of said material, said polymerizing agent being employed in amount equal to at least about 2% by weight based on the weight of said material.

6. The process of polymerizing a material selected from the group consisting of rosin and rosin esters, which comprises contacting said material at a temperature between about 50 and about 275° C. under polymerizing conditions with at least about 2% by weight based on the weight of said material of a polymerizing agent comprising a mono-alkali acid salt of sulfuric acid.

7. The process of polymerizing a material selected from the group consisting of rosin and rosin esters which comprises contacting said material at a temperature between about 50 and about 275° C. with at least about 2% by weight based on the weight of said material of a polymerizing agent comprising sodium acid sulfate.

8. The process of polymerizing a material selected from the group consisting of rosin and rosin esters, which comprises contacting said material at a temperature between about 50° and about 275° C. with at least about 2% by weight based on the weight of said material of a polymerizing agent comprising a mono-alkali acid salt of orthophosphoric acid.

9. The process of polymerizing a material selected from the group consisting of rosin and rosin esters which comprises contacting said material at a temperature between about 50° and about 275° C. with at least about 2% by weight based on the weight of said material of a polymerizing agent comprising mono-sodium acid phosphate.

10. The continuous process of polymerizing a material selected from the group consisting of rosin and rosin esters which comprises continuously bringing said material at a temperature between about 50 and about 275° C. in liquid form into contact with at least about 2% by weight based on the weight of said material of a polymerizing catalyst selected from the group consisting of a mono-alkali acid salt of an acid selected from the group consisting of sulfuric and phosphoric acids, for a period of time sufficient to effect at least a 5° C. increase in melting point of said material, and continuously separating the polymer from said catalyst.

OSCAR A. PICKETT.

CERTIFICATE OF CORRECTION.

Patent No. 2,320,795.                                       June 1, 1943.

OSCAR A. PICKETT.

It is hereby certified that error appears in the printed specification of the above numbered patent requiring correction as follows: Page 3, second column, line 7, claim 4, for "290" read --2%--; and that the said Letters Patent should be read with this correction therein that the same may conform to the record of the case in the Patent Office.

Signed and sealed this 20th day of July, A. D. 1943.

(Seal)
                                        Henry Van Arsdale,
                                    Acting Commissioner of Patents.